June 11, 1968 E. A. LA CHAPELLE 3,387,952

MULTILAYER THIN-FILM COATED SUBSTRATE WITH METALLIC PARTING LAYER TO PERMIT SELECTIVE SEQUENTIAL ETCHING

Filed Nov. 9, 1964 2 Sheets-Sheet 1

INVENTOR.
EDWARD ALBERT LaCHAPELLE

BY

OSTROLENK, FABER, GERB & SOFFEN
ATTORNEYS

INVENTOR.
EDWARD ALBERT La CHAPELLE
BY
OSTROLENK, FABER, GERB & SOFFEN
ATTORNEYS

United States Patent Office 3,387,952
Patented June 11, 1968

3,387,952

MULTILAYER THIN-FILM COATED SUBSTRATE WITH METALLIC PARTING LAYER TO PERMIT SELECTIVE SEQUENTIAL ETCHING

Edward A. La Chapelle, Raritan Township, Hunterdon County, N.J., assignor to Western Electric Company, Incorporated, New York, N.Y., a corporation of New York Filed Nov. 9, 1964, Ser. No. 409,890
10 Claims. (Cl. 29—183.5)

ABSTRACT OF THE DISCLOSURE

A nonconductive substrate is first coated with a resistive layer, a parting layer of highly conductive and anodizable material, and then a layer of metal such as tantalum. The entire structure is selectively, sequentially etched to form one or more resistors from the resistor layer and to form from the parting and metal layers areas which will ultimately serve as one or more capacitor electrodes and capacitor dielectrics, respectively.

After such etching, the metal layer is anodized to produce a capacitor dielecrtic. Anodization is possible because the underlying parting layer (which is included in an anodizing circuit due either to penetration into the metal layer or to anodization across the edges of all of the layers) is anodizable. The unanodized portion of the parting layer, being highly conductive, serves as an electrode of a high-Q capacitor. Unanodized portions of the resistor are trim anodized to value.

This invention is directed to a multilayer, thin-film coated substrate which can be processed into integrated thin film R-C or R-C-L circuits in which the capacitor has a low dissipation factor. The invention provides an article and method of manufacture whereby a plurality of equal-area and/or full surface coating films may be deposited on a substrate in a one pass continuous in-line vacuum process, and after all the metal film depositions are completed, the coated substrate may be subjected to a selective sequential etching process to form an integrated thin-film R-C or R-C-L circuit in which the capacitor has a low dissipation factor.

Tantalum nitride is desirable for resistor paths in thin-film circuitry, but is not as suitable for capacitor dielectrics. Tantalum, when properly treated, for example by anodizing, is desirable for forming capacitor dielectrics and is also suitable for resistors of moderate stability. However, for resistors requiring high stability, tantalum nitride is often used. Therefore, both layers of tantalum and tantalum nitride are desirable for integrated tantalum thin-film R-C circuits. It is also desirable that the materials be deposited as area films in one pass in a continuous in-line vacuum process to form a multilayer structure, and that a circuit be fabricated from such a structure by a selective sequential etching process. Such a manufacturing technique not only has economc advantages, but also minimizes the possibility of contamination between depositions and eliminates the need for masking during the depositions. Use of this technique, however, presents a problem snce tantalum and tantalum nitride are attacked by the same etchants.

This problem may be obviated, as disclosed in the copending application of J. W. Balde, Ser. No. 409,656, filed on even date with this application and assigned to the same assignee, by providing an intermediate layer, termed a "parting layer," between the tantalum nitride and the tantalum layers. Such a layer functions to protect one of the layers while the other is being etched.

The present invention provides a new and improved parting layer material. More particularly, in accordance with the present invention, the parting layer is composed of a highly conductive anodizable metal, such as aluminum. The advantage of using such a material is that it not only serves as the parting layer, but also serves as the main constituent of the capacitor lower-electrodes, thereby enabling, because of its high conductivity, capacitors having a relatively low dissipation factor. Additionally, the high conductivity parting layer provides a low resistance path under any terminal areas, interconnection paths or inductors of the final circuit.

A typical multilayer, thin-film coated substrate according to the invention may include a nonconductive substrate coated with a resistor layer of tantalum nitride, a parting and capacitor-electrode layer of aluminum and a capacitor-dielectric layer of tantalum. If desired, an additional layer of conductive material may be provided from which the terminal areas of the circuit may be formed. Any interconnection paths or inductors could either be formed from this additional conductive layer or from the parting layer.

Advantageously, such a multilayer, thin-film coated substrate may be processed into an integrated circuit by applying a first resist on those portions of the conductive layer that are to serve as terminal areas and, if desired, also to those portions which are to serve as interconnection paths and inductors. The coated substrate is then exposed to a first etchant which removes the exposed portions of the conductive layer. Thereafter, the first resist is removed and a second resist is applied to mask the areas previously protected, as well as those where interconnection paths and capacitors are desired. If inductors are to be formed, the second resist could also protect those areas. The coated substrate is then subjected to a second etchant which passes through the exposed tantalum and attacks the underlying aluminum, thereby "floating" off the exposed tantalum. Thereafter, the second resist is removed and a third resist is applied to the areas previously protected and to those surfaces that are to serve as resistor paths. The coated substrate is then exposed to a third etchant to form the resistor paths.

After etching, the tantalum capacitor portions are anodized to form capacitor dielectrics of tantalum pentoxide, and the resistors of tantalum nitride are trim anodized to value. Capacitor counter-electrodes of gold are then deposited over the dielectrics.

It is an object of this inventon to provide a novel, multilayer thin-film coated substrate, as by means of a continuous, in-line, vacuum deposition process, which may be processed by selective etching and subsequent coating steps to produce integrated thin-film R-C or R-C-L circuits. It is a related object to provide a novel method for processing the coated substrate to produce such integrated thin-film circuits.

Another object of this invention is to provide a novel parting layer material for use between layers of materials attacked by the same etchants, to enable selective and sequential etching of the layers.

Another object of this invention is to provide a novel article of manufacture comprised of a coated substrate which can be processed by selective sequential etching to create integrated circuits in which the capacitors have a high quality or low dissipation factor.

These and other objects of the invention will be better understood from the detailed description which follows, taken in connection with the drawings, in which:

FIGURE 3A also shows the resultant coated substrate after a second etchant is applied to the capacitor, interconnections and terminal areas.

The substrate 11 to be used in connection with this invention can be either a flat sheet of glass, ceramic, etc., as is well known in the art and forms no part of this invention. It is noted that the substrate 11 must be properly cleaned to remove all organic contamination before it is placed in a continuous in-line vacuum processing machine of the type described in "The Western Electric Engineer," April 1963, on pp. 9–17, as well as in copending U.S. application Ser. No. 314,412 filed Oct. 7, 1963 entitled "Methods of and Operation for Processing Materials in a Controlled Atmosphere" to S. S. Charschan and H. Westgaard and assigned to Western Electric Company, Incorporated. The various layers can be deposited on the substrate 11 in various chambers by techniques that are known in the art, as for example, by cathode sputtering, vacuum evaporation, etc. It is understood that for the purpose of illustration that all vertical dimensions of the layers in the figures are substantially enlarged and exaggerated.

I. SEQUENCE OF DEPOSITING MULTILAYERS OF THIN-FILMS ON SUBSTRATES

As will hereinafter be more fully explained, the coated substrate of FIGURES 1A and 1B will be subjected to selective sequential etching. Hence, when the various layers, such as 12, 13, 14, 15 are initially deposited on the substrate 11, they can cover the entire area of the substrate 11, and thus can be of substantially equal area. This full surface coating permits mass-production of the coated substrate since no masking or special geometric configuration for the layers is required while the substrate is in vacuum. Thus, it is understood that in each of the following steps that each layer can be applied on a substantially equal area and without masking. However, if desired, these layers may of course be deposited in limited areas, and, if desired, these layers can be deposited in any conventional way as for example in batch or bell jar deposition systems, or by chemical or vapor deposition means.

Figure 1A:
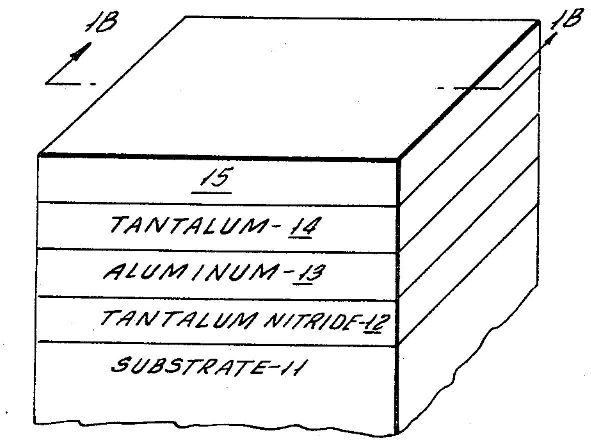
FIGURE 1A is a perspective view of the novel multilayer thin-film coated substrate.
Figure 1B:
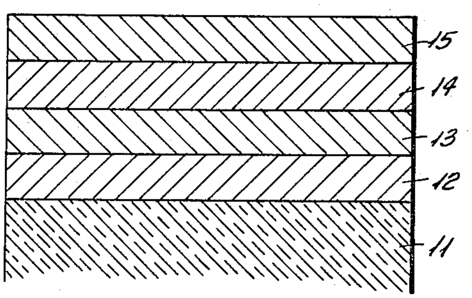
FIGURE 1B is a cross sectional view taken in the direction of the arrows 1B—1B of FIGURE 1A.

The essential layers of the novel coated substrate of this invention are, when viewed in a direction away from the substrate 11 and as seen in FIGURES 1A and 1B.

(1) a resistor layer 12 which can be a thin-film deposit of tantalum nitride (2) a highly conductive anodizable parting and capacitor-electrode layer 13 which can be a thin-film deposit of aluminum, and (3) a capacitor dielectric layer 14 which can be a deposit of tantalum.

The etchant used to attack resistor layer 12 to form the resistor paths, may undercut the substrate 11. Thus it is desirable in some instances to initially deposit a protective layer of metal oxide, such as tantalum pentoxide, directly on the substrate 11 to prevent or minimize undercutting thereof. The purpose and function of a protective oxide layer is described in greater detail in copending U.S. application Ser. No. 94,543 filed Mar. 9, 1961, entitled, "Oxide Underlying for Printed Circuit Components," to D. A. McLean and D. S. Nicodemus assigned to Bell Telephone Laboratories Incorporated.

When the resistor paths of an integrated circuit are to be created by the application of an etchant to the coated substrate, it is only necessary to select an etchant which will attack the resistor layer 12. An etchant can be selected, however, which would attack layer 12 but would not undercut the substrate 11 thereby alleviating the necessity for a protective oxide layer on the substrate 11. However, if it is desired or necessary to obtain a finer definition of the resistor paths, it may be necessary to use an etchant such as hydrofluoric nitric acid ($HF=HNO_3$) which may undercut the substrate 11. Under these circumstances, it may be necessary to deposit on the substrate 11 a protective oxide layer of tantalum pentoxide to a thickness of approximately 1000 A. Thus, if it is desirable to provide a protective oxide layer directly on the substrate 11, it can be used. However, for simplicity, such protective oxide layer is not illustrated in the figures.

The resistor layer 12 of tantalum nitride is deposited by sputtering a layer thereof of approximately 1200 A. directly on the substrate 11. However, if a protective oxide layer is used, the resistor layer 12 is deposited directly on the protective oxide layer. The layer 12 is ultimately to form the resistor paths, and may be referred to as a metal layer, resistor layer or a tantalum nitride layer depending upon its composition.

In the next chamber of a continuous in-line vacuum processing machine, the highly conductive and anodizable parting and capacitor-electrode layer 13 of aluminum is deposited by sputtering or evaporating. The thickness of the layer 13 may be approximately 2000 A. It is noted that the layer 13 while preferably of aluminum could be composed of any other highly conductive and anodizable material. This layer 13 is novel in this invention. Since aluminum has a high conductivity, it can be used as a portion of the lower electrode of the capacitor, and thus the subsequent tantalum layer 14 need only have a minimum thickness sufficient to permit it to be anodized to form a capacitor dielectric.

The substrate 11 is then moved to the next chamber where a tantalum capacitor-dielectric layer 14 is deposited over the parting and capacitor-electrode layer 13 by sputtering. The thickness of the capacitor-dielectric layer 14 may be approximately 1500 to 1800 A. As noted, the tantalum layer 14 thickness is minimum since this layer is deposited primarily to serve and function as the capacitor dielectric when it is oxidized by way of an anodizing process. It is also noted that since the capacitor dielectric layer 14 need have only a minimum thickness, there is no problem of it expanding at a rate different from the substrate 11.

The layer 13, as previously noted, should be a highly conductive material. However, if the overlying tantalum layer 14 will subsequently have to be anodized to form a capacitor dielectric, the layer 13 must also be anodizable or else it would, by its conductivity, prevent any effective anodization of the tantalum layer 14. Hence if the layer 14 is to be anodized, the layer 13 should be both highly conductive and anodizable. Accordingly, a desirable material for the layer 13 is aluminum.

A terminal layer 15 can now be deposited on the tantalum layer 14 in order to provide terminal and/or contact areas for the integrated R-C circuit to be formed. It is known in the prior art to provide materials which will have good adherence, high conductivity and solderability, as well as resistance to oxidation. Typical examples have been chromium-nickel for good adherence; gold or copper for high conductivity and solderability; and palladium or gold for resistance to oxidation. In the prior art, when the vacuum was broken prior to the time that these layers are applied there was a problem of good adherence. Hence material such as nickel-chromium was used to minimize the adhesion problems by improving the layer bond. However, in the instant case, all layers required for the coated substrate can be applied in one pass through a continuous in-line vacuum processing machine, and thus the adherence problem is substantially reduced or eliminated. Accordingly, the nickel-chromium can be eliminated and the layer 15 to be deposited above the tantalum layer 14 need only have characteristics suitable for high conductivity, solderability and resistance to oxidation. It is noted that since the aluminum layer 13 has high conductivity, it could be used for the interconnection paths, inductor paths, contact areas and terminal area. Thus, if it were desirable to secure leads to the tantalum layer 14, it is possible to eliminate the layer 15.

As seen from the foregoing, all of the layers described in connection with FIGURES 1A and 1B can be deposited in a continuous in-line vacuum processing machine such that following initial cleaning of the substrate, the substrate 11 is not removed from vacuum until all the described layers have been deposited thereon. Thus, the possibility of contamination between deposition of the several layers is substantially reduced. Additionally, since the layers 12, 13, 14 and 15 are of substantially equal thickness, the length of time the substrate 11 remains in each chamber of the machine is substantially equal.

The multilayer thin-film coated substrate of FIGURES 1A and 1B can be mass-produced at one location as raw stock and then shipped to a plurality of second locations to be selectively sequentially etched and prepared to form the desired integrated thin-film circuits of many combinations of resistors, capacitors and inductors.

II. SELECTIVE SEQUENTIAL ETCHING OF MULTILAYER COATED SUBSTRATE

Although numerous combinations of resistors, inductors and capacitors can be selectively sequentially etched from the novel coated substrate of this invention, the description and drawings illustrate the steps to be taken at a second location to manufacture a circuit of a resistor in series with a parallel resistor-capacitor.

The coated substrate of FIGURES 1A and 1B initially has a first resist 21*a*, 21*b* applied on portions of the layer 15 which are to be the terminals of the completed integrated R-C circuit. If it is desired, the first resist could also be applied to the interconnection paths, such as indicated by the dotted line 21*c*, and/or inductor paths. However, for purposes of illustration, it is here assumed that the first resist is not applied in the interconnection path and the formation of an inductor is not desired. In the event the coated multilayered substrate of FIGURES 1A and 1B does not have a layer 15, then the terminal areas can be created in the manner hereinafter described for the interconnection path.

Figure 2A:
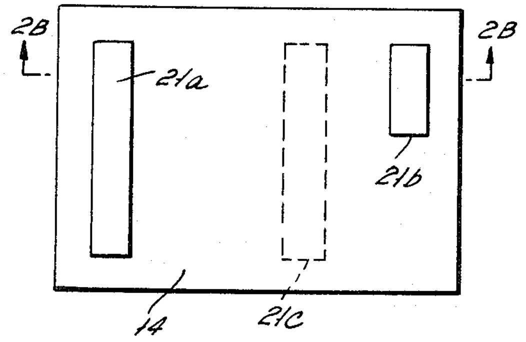
FIGURE 2A is a top view of the coated substrate showing the first resist applied to the terminal areas and shows the resultant coated substrate after the first etchant has been applied.
Figure 2B:
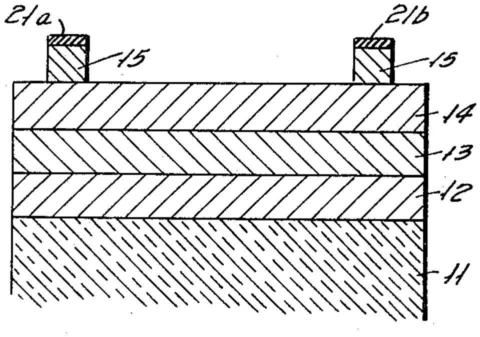
FIGURE 2B is a cross sectional view of the coated substrate taken in the direction of the arrows 2B—2B of FIGURE 2A.

The first resist 21*a* and 21*b* is a metal etch resist such as wax or vinyl as is known in the art. A first etchant is selected which will etch the exposed portions of layer 15 but not attack the capacitor-dielectric layer 14 i.e., tantalum. A typical example for a first etchant would be ferric chloride ($Fe_2Cl_3$) or a combination of nitric and hydrochloric acid ($HNO_3$, HCl) (aqua regia). The resultant coated substrate, after the first etchant has been applied, is seen in FIGURES 2A and 2B wherein the exposed areas of the highly conductive layer 15 have been removed.

It is noted that it is difficult to have a single resist withstand several applications of different etchants. Furthermore, it is the usual practice to select the best resist for the particular etchant to be used and the desired or required resolution. Therefore, in the description, the first resist 21*a*, 21*b* is used with the first etchant and after the exposed area of the terminal layer 15 is removed, the first resist is removed by appropriate solvents.

Figure 3A:
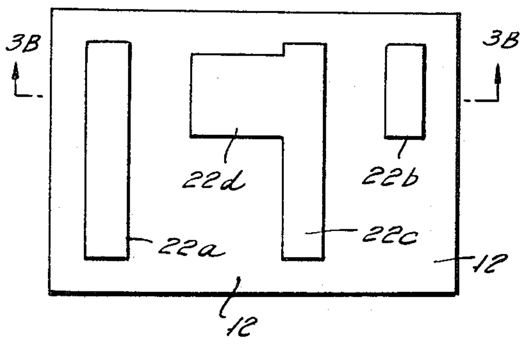
FIGURE 3A is a top view, similar to FIGURE 2A but shows the second resist applied to the terminal areas, the interconnection path, and the area to form a portion of the capacitor.
Figure 3B:
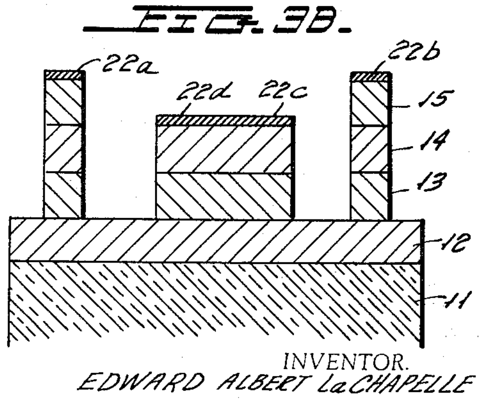
FIGURE 3B is a cross sectional view of the coated substrate taken in the direction of the arrows 3B—3B of FIGURE 3A.

A second resist 22, such as 22*a* and 22*b*, is therefore applied, as seen in FIGURES 3A and 3B, to the same areas as were previously covered by the first resist. If the first resist is not removed, then the second resist could be applied over the first resist. The areas, where it is desired that the highly conductive material of layer 13 serve as an interconnection, are also covered by the second resist. Thus the second resist 22*c* is applied to the tantalum layer 14 as seen in FIGURES 3A and 3B. As noted, if there is a layer 15, the interconnection paths could be formed at the same time as the terminal layers (21*a*–21*b*) or if the coated substrate does not have a terminal layer 15, the terminal areas could be formed at the same time that the interconnecting paths (22*c*) are formed. Also the portion of the tantalum layer 14 which is subsequently to serve as a capacitor dielectric of the integrated thin-film R-C circuit, has the second resist 22*d* applied as seen in FIGURES 3A and3B. Furthermore if inductor paths are to be formed, they could be formed in the manner described for the interconnection paths.

A second etchant is selected which does not directly attack the tantalum layer 14, but will pass through layer 14 to attack the underlying aluminum layer 13 and will not attack the resistor layer 12. This principle of "undercutting" with an etchant is described in copending U.S. application S.N. 150,809 filed Nov. 7, 1961 entitled "Method of Making Printed Circuit Component" to J. W. Balde, W. E. Dewey, and H. M. Pepiot and assigned to Western Electric Company, Incorporated. A typical second etchant is hydrochloric acid (HCl) (or 2 normal sodium hydroxide used at room temperature). After aluminum layer 13 has been etched by the second etchant, the tantalum layer 14 floats off as a result of the undercutting. After the second etchant has been applied, the resultant coated substrate is as seen in FIGURES 3A and 3B.

The second resist 22*a*, 22*b*, 22*c*, 22*d*, can now be removed by appropriate solvents. All the areas previously covered by the second resist are now covered by a third resist as seen by 23*a*, 23*b*, 23*c*, 23*d* in FIGURES 4A and 4B. The third resist is also applied to the portions of the tantalum nitride layer 12 that are to be the resistor paths, as for example, 23*e* and 23*f*, as seen in FIGURES 4A and 4B.

A third etchant is selected which will attack the exposed tantalum nitride layer 12. A typical example of a third resist would be a hot concentrate of sodium hydroxide (NaOH). As previously noted, hydrofluoric-nitric acid ($HF\text{-}HNO_3H_2O$) could also be used but it may then be desirable to have a protective oxide coating on the substrate 11 beneath the tantalum nitride layer 12 to prevent undercutting. The third etchant will attack the exposed portions of the tantalum nitride layer 12 so that the resistor paths can be formed and the resultant coated substrate will be as seen in FIGURES 4A and 4B.

III. STEPS FOLLOWING SELECTIVE SEQUENTIAL ETCHING

Figure 4A:
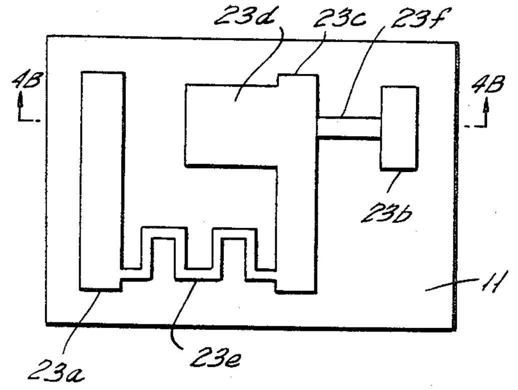
FIGURE 4A is a top view of a coated substrate similar to FIGURE 3A and illustrates a third resist applied to the terminal areas, the interconnection path, the capacitor area and the resistor paths. This figure also shows the resultant coated substrate after the third etchant has been applied.
Figure 4B:
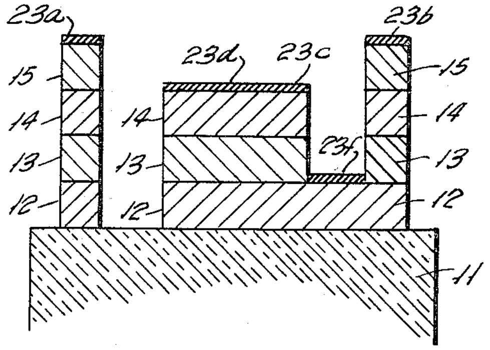
FIGURE 4B is a cross-sectional view of the coated substrate taken in the direction of the arrows 4B—4B of FIGURE 4A.

The novel coated substrate as noted above in Section I and as seen in FIGURES 1A and 1B, is selectively sequentially etched as noted above in Section II to create the coated substrate as illustrated in FIGURES 4A and 4B. The subsequent steps of anodizing, depositing upper electrode, etc., are all well known in the art, and therefore will only be briefly described.

Figure 5:
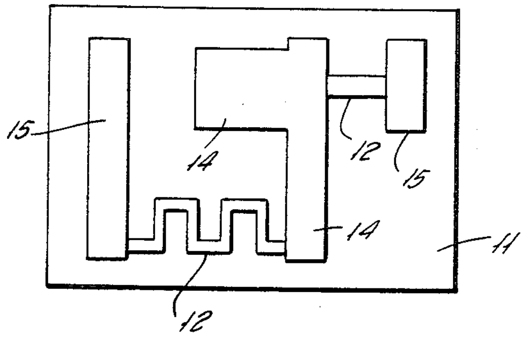
FIGURE 5 is a top view of a coated substrate of FIGURES 4A and 4B after all the resist has been removed.

The third resist 23*a*, 23*b*, 23*c*, 23*e*, 23*f*, is removed by appropriate solvents, thereby resulting in the coated substrate as seen in FIGURE 5.

Figure 6:
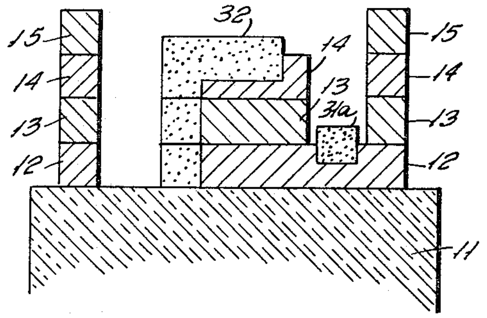
FIGURE 6 is a cross-sectional view of the coated substrate of FIGURE 5 but also illustrates the portions of the capacitor area and resistor paths that have been anodized.
Figure 7A:
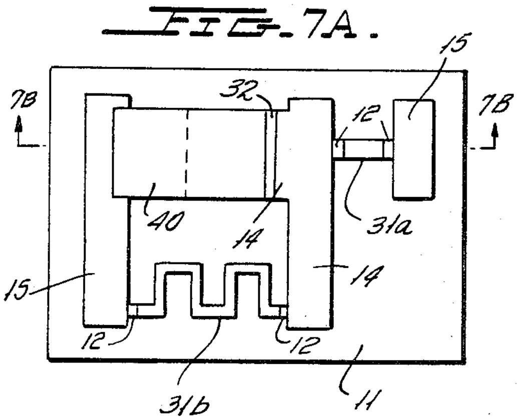
FIGURE 7A is a top view of the coated substrate of FIGURE 6 but illustrates the deposit of the capacitor counter-electrode.

The exposed portions of the tantalum nitride 12 that represent the resistor paths, namely where the third resist 23*e* and 23*f* has been applied, are now trim anodized to value, as seen by the numerals 31*a* and 31*b* in FIGURES 6 and 7A.

Also, the portion of the coated substrate representing the lower capacitor-electrode, including part of the area where the third resist 23*d* had been applied, can be anodized, as seen by the numeral 32 in FIGURES 6 and 7A, to thereby create the capacitor dielectric. It is noted that since the layer 13 is made of an anodizable material, such as aluminum, the tantalum layer 14 can be anodized even though the layer 13 is highly conductive. However, alternatively a dielectric material can be deposited on the lower electrode, in a similar area indicated by the numeral 32, instead of anodizing.

Figure 7B:
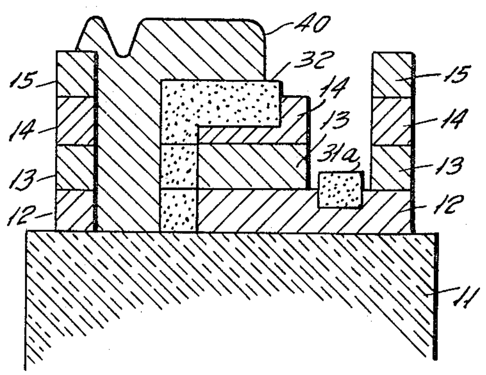
FIGURE 7B is a cross-sectional view of the coated substrate taken in the direction of the arrows 7B—7B of FIGURE 7A.

Thereafter the upper capacitor-electrode which leads to one of the terminal areas can be deposited in a conventional manner as illustrated by the numeral 40 in FIGURES 7A and 7B. A preferred upper electrode 40 is gold (Au).

The integrated thin-film R-C circuit of FIGURES 7A and 7B has a left and right terminal 15 and the circuit would be as follows: From left terminal layer 15 through upper capacitor-electrode 40, dielectric 32, lower capacitor-electrode 14, 13, 12, through the resistor path of tantalum nitride 12 below the oxide 31*a*, up through layers 12, 13, 14 to right terminal 15. A resistor under oxide 31*b* is in parallel with the capacitor and the circuit is from left terminal 15 down through layers 14, 13, 12, through the resistor path of tantalum nitride 12 under oxide 31*b* and across the interconnection path of aluminum 13 (area previously covered by resist 23*c*) down to the resistor path below oxide 31*a*, up through the right-hand layers 12, 13, 14 to the right terminal layer 15.

Accordingly, the present invention provides a novel coated substrate that can be mass-produced without masking in a one pass continuous in-line vacuum processing machine, and thereafter selectively sequentially etched to thereby form integrated thin-film R-C or R-C-L circuits. It is particularly noted that the aluminum layer, deposited between the tantalum and tantalum nitride layer has a high conductivity and thus almost all of the tantalum can be used as a capacitor dielectric. The aluminum layer can function as a portion of the lower plate of the capacitor. Furthermore, since the aluminum is in intimate contact with the tantalum nitride layer, there is a minimum of resistance introduced into the capacitor, and thus the capacitor can have a high quality and low dissipation factor.

Although there has been described a preferred embodiment of this novel invention, many variations and modifications will now be apparent to those skilled in the art.

I claim:

1. A coated substrate from which an integrated thin-film circuit may be fabricated and having a plurality of thin-film layers deposited thereon in the following sequence when viewed in a direction away from the substrate:

a resistor layer of a tantalum compound, a highly conductive anodizable parting and capacitor-electrode layer, and a capacitor dielectric layer; and said coated substrate capable of being selectively sequentially etched by etchants to subsequently form an integrated thin-film circuit.

2. A coated substrate from which an integrated thin-film circuit may be fabricated and having a plurality of equal area thin-film layers of material deposited thereon in the following sequence:

a tantalum nitride layer, a highly conductive anodizable layer, a tantalum layer; and said coated substrate capable of being selectively sequentilly etched to subsequently form an integrated thin-film R-C circuit.

3. The coated substrate of claim 2 in which said highly conductive anodizable layer is a deposit of aluminum.

4. The coated substrate of claim 3 in which said tantalum layer, said aluminum layer and said tantalum nitride layer are deposited to thickness differing from each other by less than 800 A.

5. A coated substrate from which an integrated thin-film circuit may be fabricated and having a plurality of equal area thin-film layers of material deposited thereon in the following sequence:

a tantalum nitride layer, a highly conductive anodizable layer, a tantalum layer and a terminal layer; and said coated substrate capable of being selectively sequentially etched by first, second and third etchants to subsequently form an integrated R-C circuit.

6. The coated substrate of claim 5 in which the highly conductive anodizable layer is aluminum.

7. A coated substrate having a plurality of equal area thin-film layers of material deposited thereon in a continuous in-line vacuum process and including at least the following sequence:

a tantalum nitride layer, an aluminum layer and a tantalum layer;

said tantalum nitride layer being deposited to a thickness of approximately 1200 A.;

said aluminum layer being deposited to a thickness of approximately 2000 A. and said tantalum layer being deposited to a thickness of approximately 1500 to 1800 A.;

said aluminum layer being attackable by an etchant passing through said tantalum layer;

said tantalum layer capable of functioning as a capacitor dielectric when anodized, said tantalum nitride capable of functioning as a resistor; and said aluminum layer providing a low resistance connection to said tantalum nitride layer to thereby permit low dissipation factor capacitors to be fabricated from said coated substrate.

8. A coated substrate from which an integrated thin-film circuit may be fabricated and having a plurality of equal thin-film area layers deposited thereon in the following sequence when viewed in a direction away from the substrate:

a first layer which includes a tantalum compound, a second layer of a highly conductive anodizable material, and a third layer of metal similar to said first metal; and said coated substrate capable of being selectively sequentially etched by etchants to subsequently form an integrated thin-film circuit.

9. A coated substrate from which an integrated thin-film circuit may be fabricated and having a plurality of equal area thin-film layers of material deposited thereon in the following sequence:

a resistor layer of anodizable material including a tantalum compound, a highly conductive anodizable parting and capacitor-electrode layer, and a capacitor-dielectric layer of material similar to the resistor layer; and said coated substrate capable of being selectively sequentially etched by two etchants to subsequently form an integrated circuit.

10. A coated substrate having a plurality of equal area thin-film layers of material deposited thereon in a continuous in-line vacuum process and including at least the following sequence:

a tantalum compound layer, a highly conductive layer and a tantalum layer;

said highly conductive layer being capable of being attacked by an etchant passing through said second tantalum layer;

said second tantalum layer capable of functioning as a capacitor dielectric when anodized;

said first tantalum layer capable of functioning as resistors; and said highly conductive layer providing a low resistance connection between said first and second tantalum layers to thereby permit low dissipation factor capacitors to be fabricated from said coated substrate.

References Cited

UNITED STATES PATENTS 3,256,588 6/1966 Sikina et al. -------- 117—212

RALPH S. KENDALL, *Primary Examiner.*

ALFRED L. LEAVITT, *Examiner.*

A. M. GRIMALDI, *Assistant Examiner.*

UNITED STATES PATENT OFFICE

CERTIFICATE OF CORRECTION

Patent No. 3,387,952

June 11, 1968

Edward A. La Chapelle

It is certified that error appears in the above identified patent and that said Letters Patent are hereby corrected as shown below:

Column 4, line 32, "(HF=$HNO_3$)" should read -- (HF-$HNO_3$) --.

Signed and sealed this 7th day of October 1969.

(SEAL)
Attest:

Edward M. Fletcher, Jr.
Attesting Officer

WILLIAM E. SCHUYLER, JR.
Commissioner of Patents